Jan. 17, 1928.
A. W. NORDGREN
1,656,493
BUMPER FITTING
Filed Sept. 6, 1927
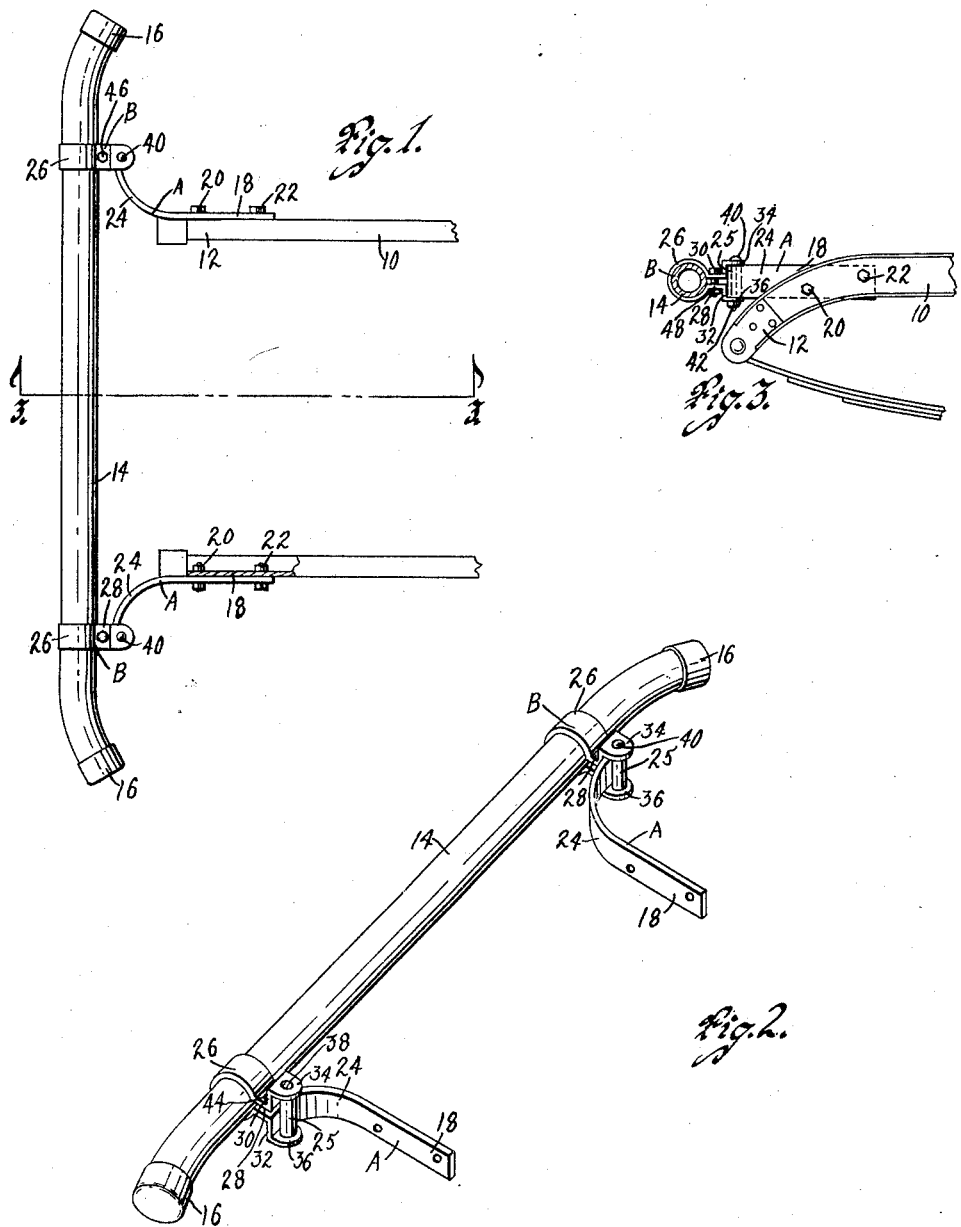

Patented Jan. 17, 1928.

1,656,493

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER FITTING.

Application filed September 6, 1927. Serial No. 217,701.

My invention has to do with a bumper fitting adapted for mounting bumpers on cars of different makes.

My object is to provide such a fitting of simple and inexpensive construction, which has a support adapted to be mounted on cars of different makes combined with simple means for conveniently adjustably connecting the support with bumpers of different diameters at different points in the length of the bumper by clamping to the bumper and also to the support, and affording a pivotal connection between the bumper and the support.

A further purpose of my invention is to provide a structure of the kind just mentioned, having parts so arranged that they will be sprung when assembled and by their resiliency will eliminate rattling and noise.

With these and other objects in view, my invention consists in the construction, arrangement and combination of the various parts of my bumper fitting, whereby the objects contemplated are attained, as hereinafter more fully set forth, pointed out in my claims, and illustrated in the accompanying drawings, in which:

Figure 1 is a plan view of a pair of bumper fittings embodying my invention, associated with a round or cylindrical bumper.

Figure 2 is a perspective view of the same; and

Figure 3 is a detail, sectional view taken on the line 3—3 of Figure 1.

Many of the automobiles now being manufactured have longitudinal channel bar frame members, such as that shown in part in the drawings and indicated by the reference numeral 10. At their ends the frame members 10 may have the down-turned horns 12.

Generally these frame members are spaced apart the same distance but in some cars they vary from the standard spacing.

I have in my present invention provided a complete bumper and pair of fittings, numbering five parts in all (exclusive of bolts), which can be installed on several makes of cars, and can be readily adjusted because the fittings are easily attached to the bumpers at different points in the bumper length.

When assembled, the structure is such that rattling will be eliminated and wear can easily be taken up.

Dealers can carry repair parts stock at a small outlay and repairs are easily made.

I preferably use round or cylindrical bumpers 14, which may be tubular, and provided with end caps 16.

At its ends, the bumper 14 is preferably bent slightly rearwardly.

I provide a pair of supports A. Each support is preferably a strong flat steel or iron strap with a rearward straight portion 18 in a vertical plane, adapted to be placed alongside a frame member 10, and secured thereto by suitable means such as the bolts 20 and 22. The portions 18 project forwardly from the car, when installed, and have at their forward ends, the parts 24 curved forwardly and outwardly. The curved parts 24 are curled at their ends to form vertical eyes 25.

For connecting the supports A with the bumper, I provide a pair of clamps B. Each clamp consists of a resilient, split ring or band 26 at the ends of which are rearwardly projecting, spaced parallel portions 28. At the rear ends of the portions 28 are parts 30 and 32, extending in alignment upwardly and downwardly respectively from the portions 28. At the upper and lower ends of the parts 30 and 32 are members 34 and 36 respectively, which project rearwardly in spaced parallel relation as perhaps best illustrated in Figure 3. The members 34 and 36 are normally spaced apart a distance for conveniently receiving between them the eye. These members are provided with registering bolt holes 38.

In assembling a bumper for installation, the clamps B are slipped upon the bumper 14 and adjusted to the proper positions in the length thereof. The supports may be bolted on the car. The clamps are then adjusted till they receive between then the eyes 25. Then bolts 40 are put through the holes 38 and eyes 25 and nuts 42 are put on the bolts.

The portions 28 are provided with registering holes 44. The bolts 46 are extended through the holes 44 and receive the nuts 48. The bolts 40 and 46 are omitted from the lower left-hand part of Figure 2 in order to permit better illustration of the bolt holes 38 and 44.

The bumper 14, clamps B, and supports A may be assembled in the factory and so shipped, if that seems desirable. When they are thus assembled, and it is desired to install the complete bumper equipment on a car, the bumper may be tried, and if the supports A fit the car properly, they are bolted on. If they do not, the nuts 48 may be loosened and the clamps slid lengthwise on the bumper 14 till the proper adjustment is had, when the nuts 48 may be tightened.

The structure above described has many advantages some of which have already been referred to.

The quick adjustability of the clamp on the bumper facilitates easy assembling of the complete bumper structure and convenient installation on the car, and adjustment for different makes of cars.

Because of the resiliency of the clamps and the provision of the portions 28, parts 30 and 32 and members 34 and 36 in the arrangement and relations described, the clamps can be readily assembled even if the bumper stock varies a little in diameter, and the eyes 25 vary a little in length. The parts are simply sprung till there is a tight fit. The clamps are permitted light pivotal movement with relation to the supports to better cushion endwise blows on the bumper. Any wear is easily taken up. There will be no rattling with a structure of this kind. Its simplicity and low cost are obvious.

I claim as my invention:

1. In a bumper fitting, a flat bar having a portion adapted to be secured to a longitudinal chassis frame member and a portion curved forwardly and outwardly therefrom, the latter portion having an eye formed at its end, a resilient split ring clamp having at its ends spaced parallel portions extending away from the ring, opposite aligned parts extending upwardly and downwardly respectively from said portions, parallel spaced members projecting away from said parts and from the ring and receiving said eye between them, adjustable means for drawing said portions toward each other, and adjustable means for clamping the eye between said members.

2. In a bumper fitting, a resilient split ring clamp having formed at its ends spaced parallel portions extending away from the ring, terminating at their outer ends in parts extending away from each other in alignment, said parts having at their outer ends spaced parallel members extending away from said parts and the ring, a support having an element received between said members, means for adjustably fastening said portions together for clamping a bumper in the ring, and means for clamping said support element between said members.

3. In a bumper fitting, a resilient split ring clamp having formed at its ends spaced parallel portions extending away from the ring, terminating at their outer ends in parts extending away from each other in alignment, said parts having at their outer ends spaced parallel members extending away from said parts and the ring, a support having an element received between said members, means for adjustably fastening said portions together for clamping a bumper in the ring, and adjustable means projecting through said members and said element for securing them together and clamping the element between the members.

4. In a device of the class described, the combination of a bumper with a fitting comprising a support, a resilient split ring having projecting parts for gripping said support, means for clamping the ring on the bumper, and independent means for gripping the support between said parts.

5. In a device of the class described, a resilient split ring for receiving a cylindrical bumper, said ring having spaced projecting portions, adjustable means for securing said portions together, said portions terminating in parts projecting away from each other having at their outer ends parallel members extending away from the ring, a support having an eye, and adjustable means extending through said members and eye, whereby said ring may be clamped at various points in the length of round bumpers of varying diameters, and said members clamped on said support to permit pivotal movement with relation thereto.

Des Moines, Iowa, July 25, 1927.

ALGOT W. NORDGREN.